2 Sheets—Sheet 2.
E. PERRY & A. J. MANLEY.
HAY-LOADER.
No. 170,189. Patented Nov. 23, 1875.
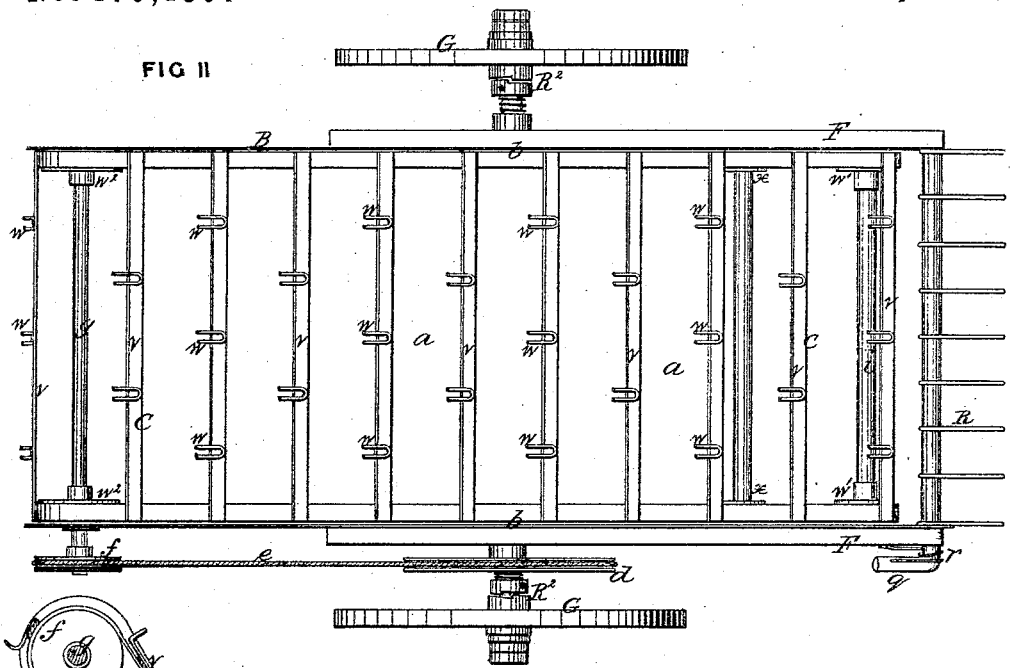
FIG II
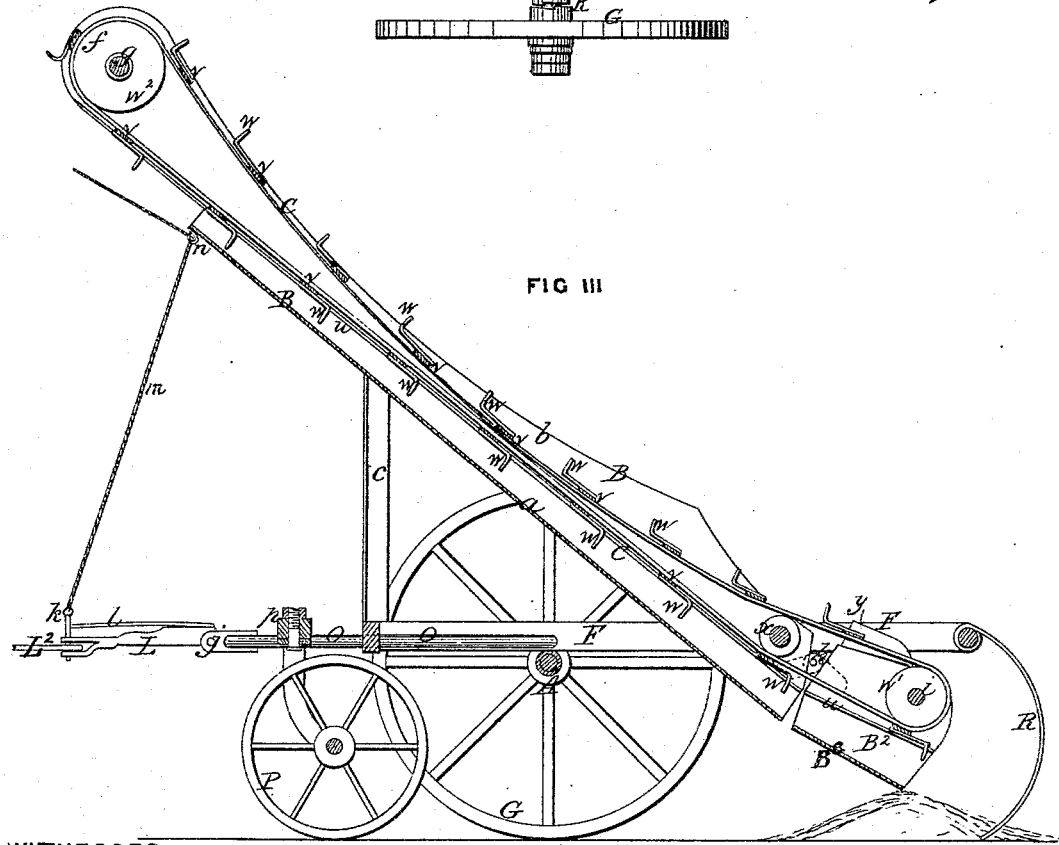
FIG III
WITNESSES
John E. Laing
J. H. Rutherford
INVENTORS
Eli Perry
and Andrew J. Manley
by Johnson and Johnson
their Attorneys

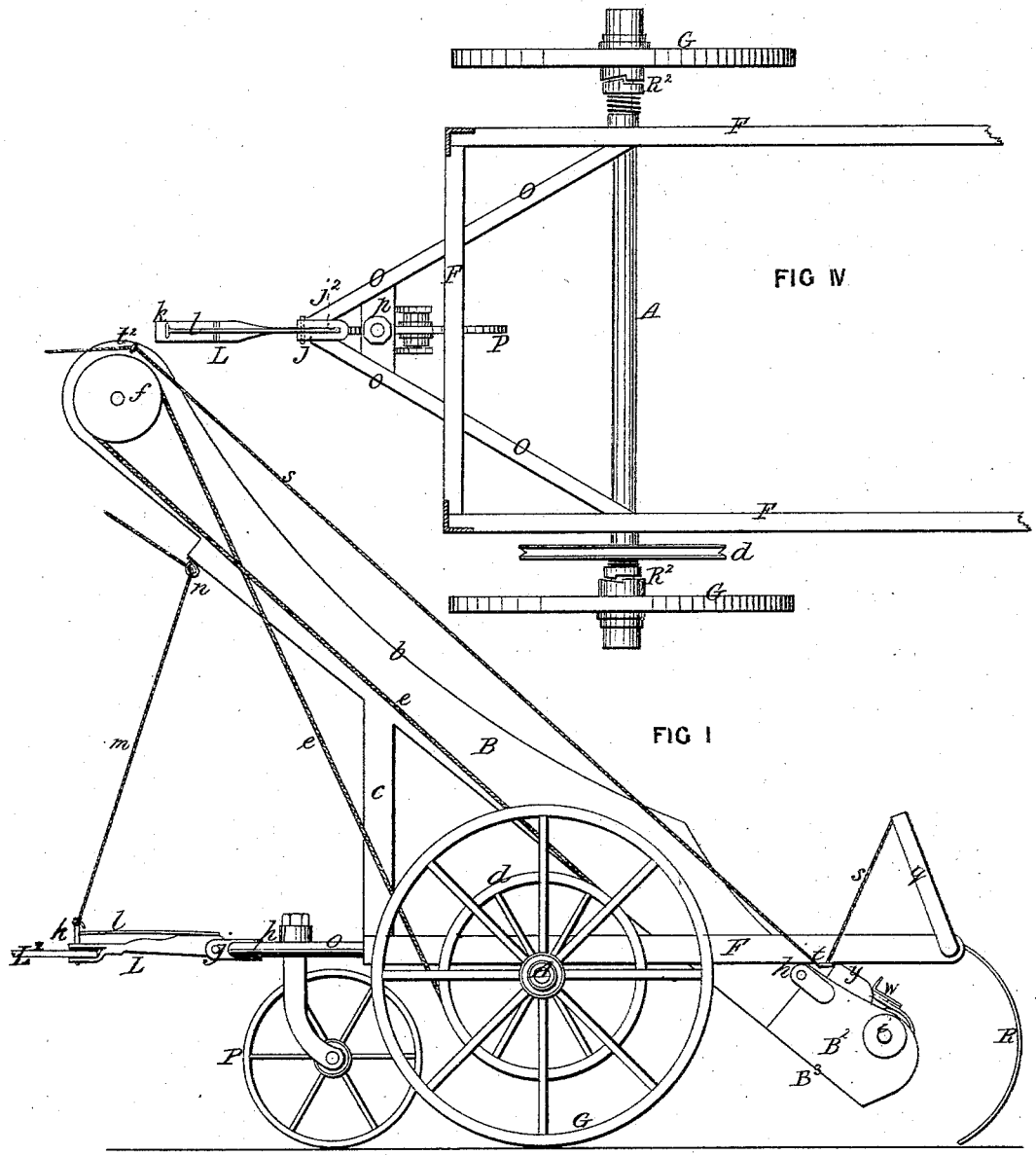

UNITED STATES PATENT OFFICE.

ELI PERRY AND ANDREW J. MANLEY, OF FOX LAKE, WISCONSIN.

IMPROVEMENT IN HAY-LOADERS.

Specification forming part of Letters Patent No. 170,189, dated November 23, 1875; application filed April 7, 1875.

*To all whom it may concern:*

Be it known that we, ELI PERRY and ANDREW J. MANLEY, of Fox Lake, in the county of Dodge and State of Wisconsin, have invented certain new and useful Improvements in Hay-Loaders; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our object is to obtain a simple construction of hay-loader, and to gather, elevate, and deliver the hay in the most effective manner upon the hay-rack.

In carrying out this object it is very important that the spring rake-teeth should be carried with as little lateral vibration as possible, in order to avoid throwing the hay sidewise while gathering it, and to make a clean rake. For this purpose it is necessary to prevent the loader from partaking, as far as possible, of the side or irregular movement of the hay-rack while being loaded.

The ordinary connection of the loader and wagon produces a considerable lateral shifting of the spring rake-teeth upon the ground, and, moreover, causes them to leave the ground at times.

To avoid this, and obtain the advantage of working without binding on undulating ground, we provide the rack-coupling with two pivot-connections, and combine therewith a central pilot caster-wheel for supporting the frame, and having a swiveling action, and thereby isolate, as it were, the loader from the irregular motion of the wagon, while at the same time the coupling serves as a braced connection, by which to turn the loader about in gathering up the hay. This feature, when combined with a central caster pilot-wheel, gives every advantage in making a clean rake, inasmuch as the caster-wheel is not affected by any vertical action of the coupling, or any horizontal vibration of the hay-rack link, with which said coupling is jointed. This construction, therefore, is eminently adapted, as a means for uniting the hay-loader to the rack, to relieve an objection hitherto existing in the ordinary hay-loader couplings. The inclined carrier-frame is provided with a lower trough-section, having a closed bottom and sides corresponding with the main carrier-frame, and pivoted at their junction, so that the joining sides and bottom of the pivoted part will flex in relation to the fixed part in passing over an obstruction or mound, and the closed bottom of the pivoted section serves thereby to protect the carrier-slat teeth from digging into the ground, while the hay is delivered from the closed adjustable bottom section to the closed bottomed main frame.

In this construction there is a very advantageous combination of the carrier-slat web with the shielding pivoted trough-section.

In the claim we shall specifically point out the features which are new to us in hay-loaders.

Figure 1 is a side elevation of a hay-loader, illustrating this invention. Fig. 2 is a plan view thereof; Fig. 3, a vertical longitudinal section on the line 3 3, Fig. 2; and Fig. 4, a plan of the caster-wheel and its frame.

The improved hay-loader has an oscillating spring-tooth rake, R, for gathering the hay, and an endless carrier, C, for taking the hay from the rake-teeth, and carrying it upon and over the smooth and solid or close bottom $a$ of a peculiar inclined bed or frame, B, and between the parallel side walls $b$ of the same. The carrier bed or frame is mounted in a simple horizontal frame, F, so as to extend down close to the ground at its rear end, where it receives the hay, and is supported at the proper angle by upright braces $c$ at the front of the horizontal frame. The latter is mounted on a pair of ground-wheels, G, at the ends of a transverse axle, A, arranged behind the center of gravity, and a central caster pilot-wheel, P, in front of the center, so as to be supported solidly at three points. The axle A is rotary, and carries a grooved wheel or pulley, $d$, which is connected by a crossed band, $e$, with a pulley, $f$, on the projecting end of a carrier-shaft, $g$, at the top of the machine. The ground-wheels G are attached to the ends of the rotary axle by backing-ratchets $R^2$, so as to rotate freely and independently when the machine is backed without operating the carrier, and without slip or strain in turning in either direction. The caster-frame of the pilot-wheel P co operates to facilitate turning by yielding laterally as required. The carrier bed or frame B is made in two sections, united at or below the horizontal frame F by transverse hinge-pivots $h$. The ground end $B^2$, which supports the lower carrier-shafts $i$, is thus adapted to yield when it encounters any obstructions, so as to prevent injury to the machine. The moment the point passes the obstruction it drops to its normal position by gravity, and its operation is continuous. For attaching the loader to a hay-wagon a coupling-link, L, is provided, and the same is attached to the frame of the machine by a horizontal pivot, $j$, and to an eye or staple on the wagon-body by a vertical pivotal pin, $k$, so as to provide against injury to either by the independent vertical movements of the wagon and loader on undulating ground, and to provide for turning by forming a flexible joint between the loader and the wagon. The coupling-pin $k$ is made movable, and is held in place by a spring, $l$, and is constructed with an eye at its upper end, to which a cord, $m$, is attached, the latter extending through an eye, $n$, at the top of the carrier-bed to within reach of the man on the load, who arranges the hay. When the wagon is loaded this cord is pulled and the loader is detached by the partial withdrawal of the coupling-pin. The loader is now ready to be attached to another wagon. The clevis, in which the attaching-bolt $j$ of the coupling-link is applied, is formed or attached within a slot, $j^2$, at the united front ends of two converging oblique draft-rods, $o$, and a cross-bar, $p$, between the same, forms the bearing of the caster pilot-wheel P immediately behind, and in line with, the coupling-link. This arrangement relieves the latter instantly from strain in turning the machine, besides providing for an equal central draft, and for distributing the draft-strain to the best advantage. The shaft of the rake R is mounted at the rear extremity of the side bars of the horizontal frame F, and has a lever-arm, $q$, at one end, to which a spring, $r$, is applied, so as to tend to press the rake-teeth down. A cord, $s$, attached to the lever-arm, and extending through eyes $t\ t^2$ to the top of the machine, provides for elevating the rake-teeth to clear an obstruction, or drop something which might injure the carrier, or to render the same inoperative in going to and from the field. The carrier C is composed of edgeways $u\ u$ and cross-bars, slats, or rattles $v$, carrying double curved teeth $w$, shown clearly in Figs. 2 and 3. The belts run over pulleys $w^1\ w^2$ on the upper and lower carrier-shafts. A supplemental roller-shaft, $x$, is introduced above the joint in the carrier-bed, and projecting guards $y$ are applied to the ground end to prevent fouling when the latter is raised. The backing-ratchets $R^2$, by which the ground-wheels are attached to the rotary axle, consist of sliding clutch-collars, meshing with corresponding shoulders or projections on the inner ends of the hubs, and held in mesh by spiral springs on the axle between them and tight collars, which latter serve additionally to prevent any endwise movement of the axle.

The peculiar carrier and carrier-bed, as regards their primary features, are applicable to thrashing-machines and other apparatus; and the lower end of the apparatus being self-adjusting allows it to readily pass over stones or other obstructions, easily conforming to the surface of the ground.

The following is claimed as new, namely:

1. The section $B^2$ of the carrier-frame B, having closed bottom, and pivots $h$ joining the fixed trough-frame, and forming a continuation of the trough thereof, and combined with the web-carrier C, substantially as herein set forth.

2. The combination, with the loader-coupling L, having the horizontal and vertical pivots $j\ k$ with the hay-rack link $L^2$, the caster P, and the spring rake-teeth R, all constructed and arranged substantially as and for the purpose herein set forth.

In testimony that we claim the foregoing as our own we have affixed our signatures in presence of two witnesses.

ELI PERRY.
ANDREW J. MANLEY.

Witnesses:
ANI BANTA,
JOHN F. DAVIES.